United States Patent [19]
Crovatto et al.

[11] 3,915,322
[45] Oct. 28, 1975

[54] VEHICLE CARRIER

[75] Inventors: Dino Crovatto; Georges F. M. P. Etienne, both of Brussels, Belgium

[73] Assignee: Caterpillar Tractor Co., Peoria, Ill.

[22] Filed: Feb. 7, 1974

[21] Appl. No.: 440,464

[52] U.S. Cl. .............................. 214/396; 280/179 R
[51] Int. Cl.² ........................................... B60P 3/00
[58] Field of Search.................. 214/392, 394, 396; 280/179 R

[56]  References Cited
UNITED STATES PATENTS

| | | | |
|---|---|---|---|
| 2,546,472 | 3/1951 | O'Connor | 214/394 |
| 2,625,372 | 1/1953 | Yerian | 214/394 |
| 2,679,329 | 5/1954 | Stout | 214/394 |
| 2,953,390 | 9/1960 | Hogstrom | 280/179 R |
| 3,028,030 | 4/1962 | Wylie | 214/396 |

FOREIGN PATENTS OR APPLICATIONS 792,685   4/1958   United Kingdom.................. 214/394

Primary Examiner—Robert J. Spar
Assistant Examiner—Lawrence J. Oresky
Attorney, Agent, or Firm—Phillips, Moore, Weissenberger

[57]  ABSTRACT

A carrier comprises an upper section, a rear section extending downwardly from the upper section and attached to a motorized vehicle and a pair of side sections extending downwardly from the upper section and each having a road wheel rotatably mounted on a lower end thereof. A plurality of winches are mounted on the carrier for attachment to a vehicle supported in the inverted, cradle-like structure formed by the carrier.

15 Claims, 6 Drawing Figures

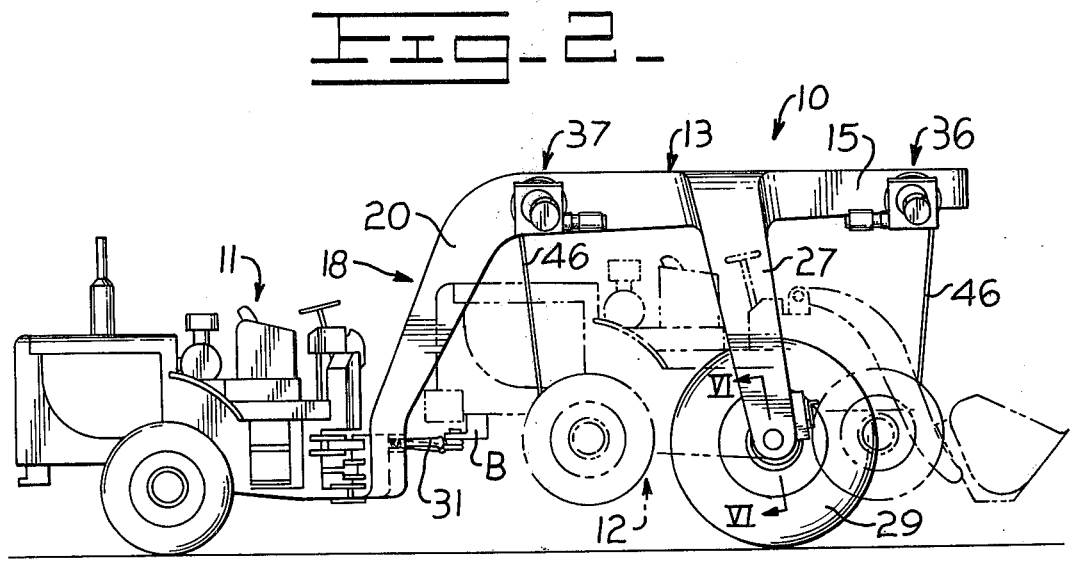
Fig_2_
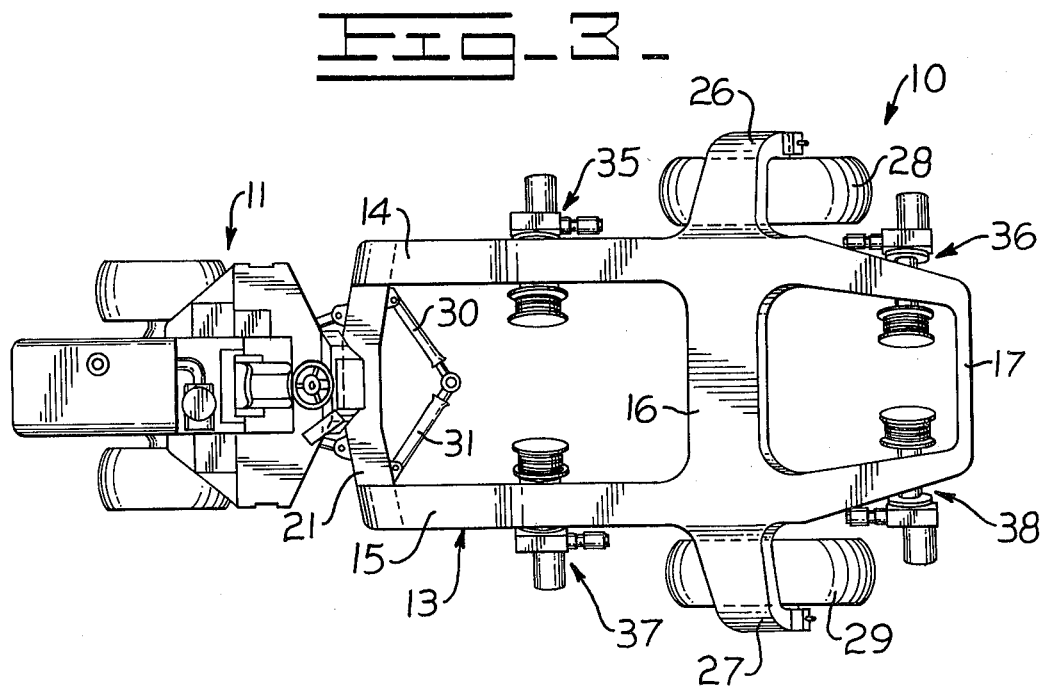
Fig_3_

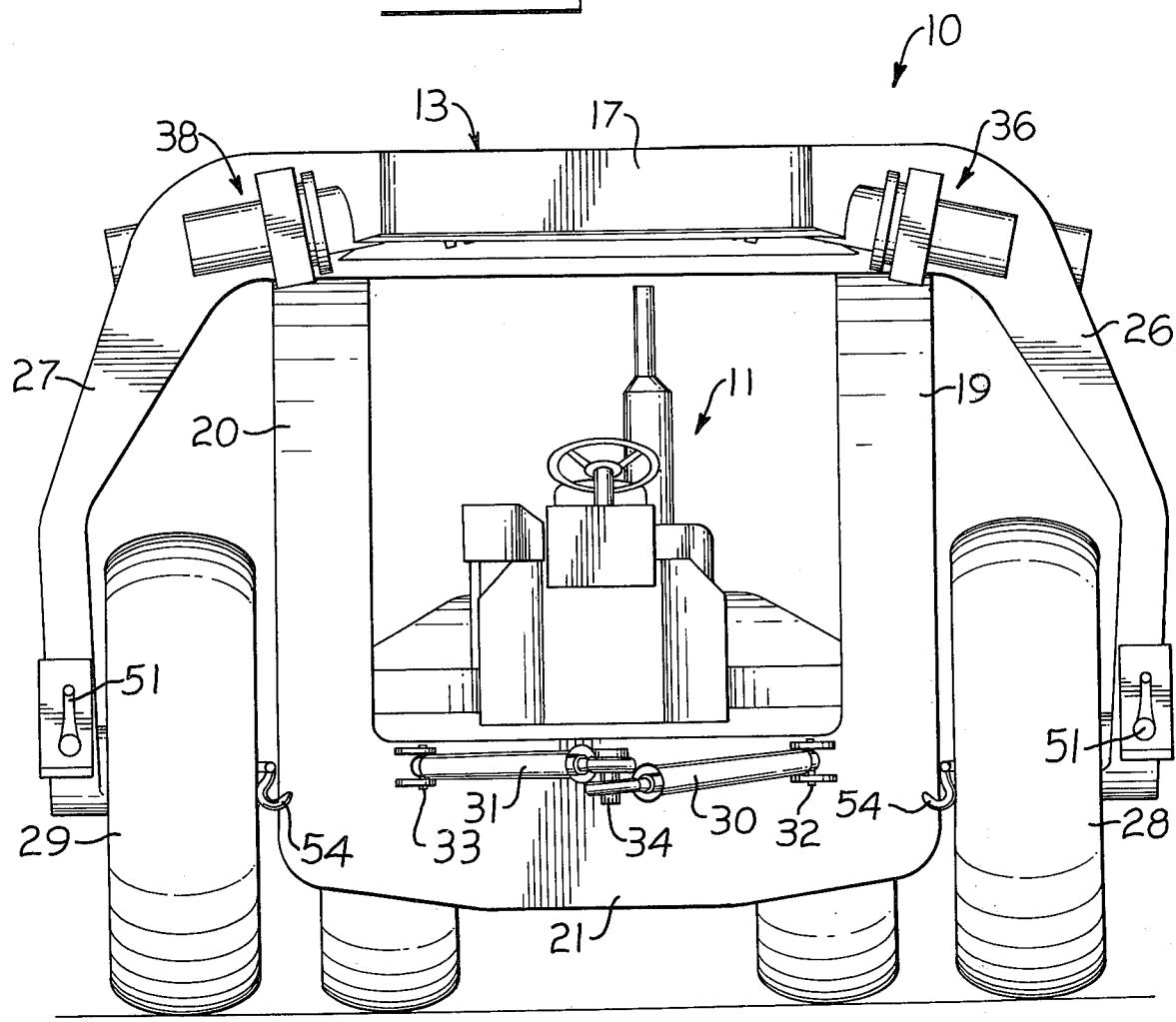

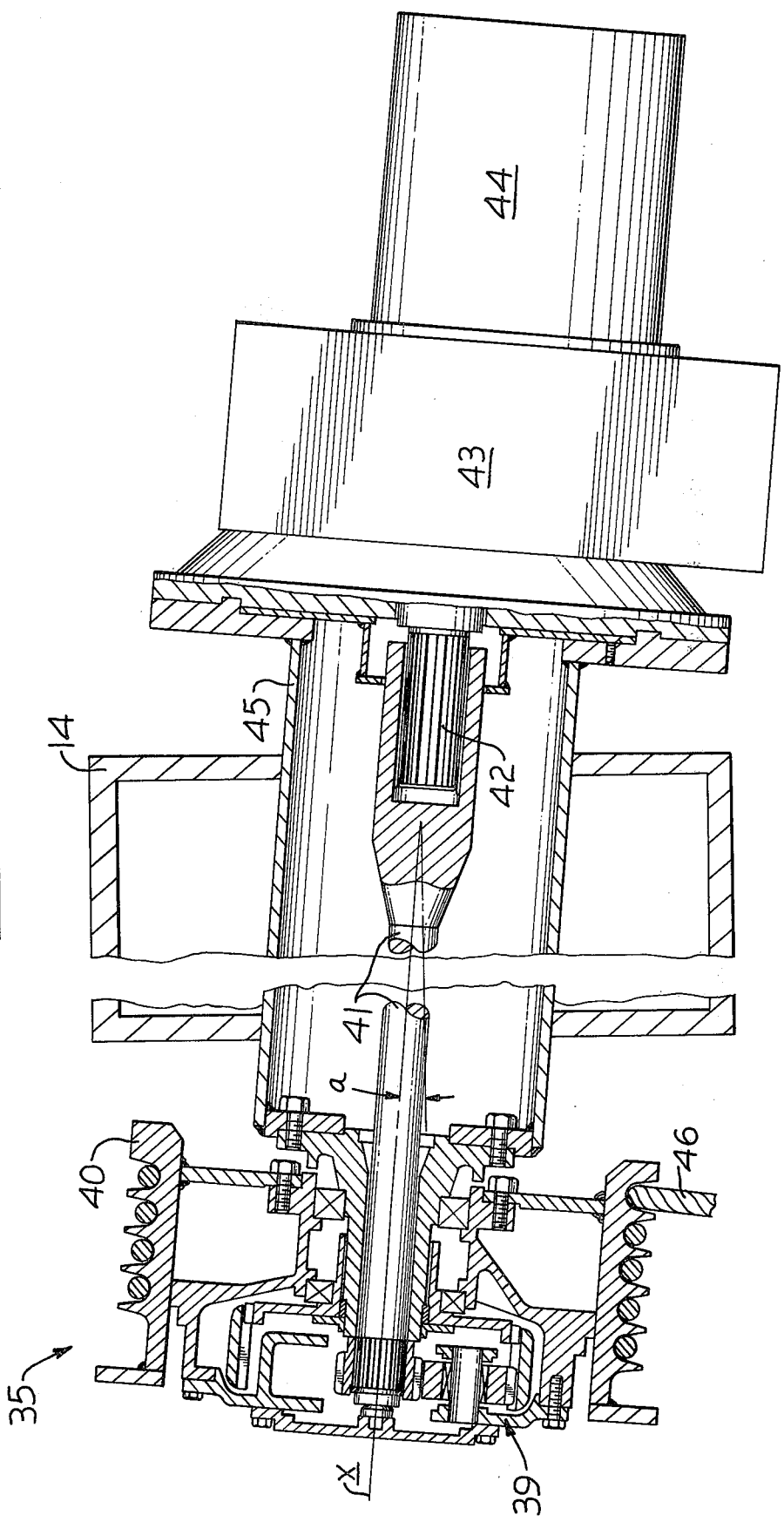

VEHICLE CARRIER

BACKGROUND OF THE INVENTION

Partially assembled vehicles, such as wheel loaders, are oftentimes transported between assembly lines or stored in a manufacturing facility. In conventional practice, cranes and the like have been utilized to perform such job tasks. The use of such cranes is time consuming and sometimes subjects the workmen and transported vehicle to injury or damage.

SUMMARY OF THIS INVENTION

An object of this invention is to provide an economical and non-complex carrier for expeditiously and efficiently transporting vehicles and the like. The carrier comprises an upper section having a rear section secured to its rearward end and a pair of laterally spaced side sections extending downwardly therefrom to form an inverted cradle. A road wheel is rotatably mounted on a lower end of each of the side sections and attachment means are mounted on the carrier for releasably attaching a load in the inverted cradle formed by the carrier. In the preferred embodiment of this invention, a lower end of the rear section is attached to a motorized vehicle.

BRIEF DESCRIPTION OF THE DRAWINGS

Other objects of this invention will become apparent from the following description and accompanying drawings wherein:

FIG. 2 is a reduced, side elevational view thereof, but with the wheel loader being illustrated by phantom lines;

FIG. 3 is a top plan view thereof, but with the wheel loader removed from the carrier;

FIG. 4 is an enlarged front elevational view thereof;

FIG. 5 is a partially sectioned elevational view of a winch assembly employed on the carrier.

DETAILED DESCRIPTION

Figure 1:
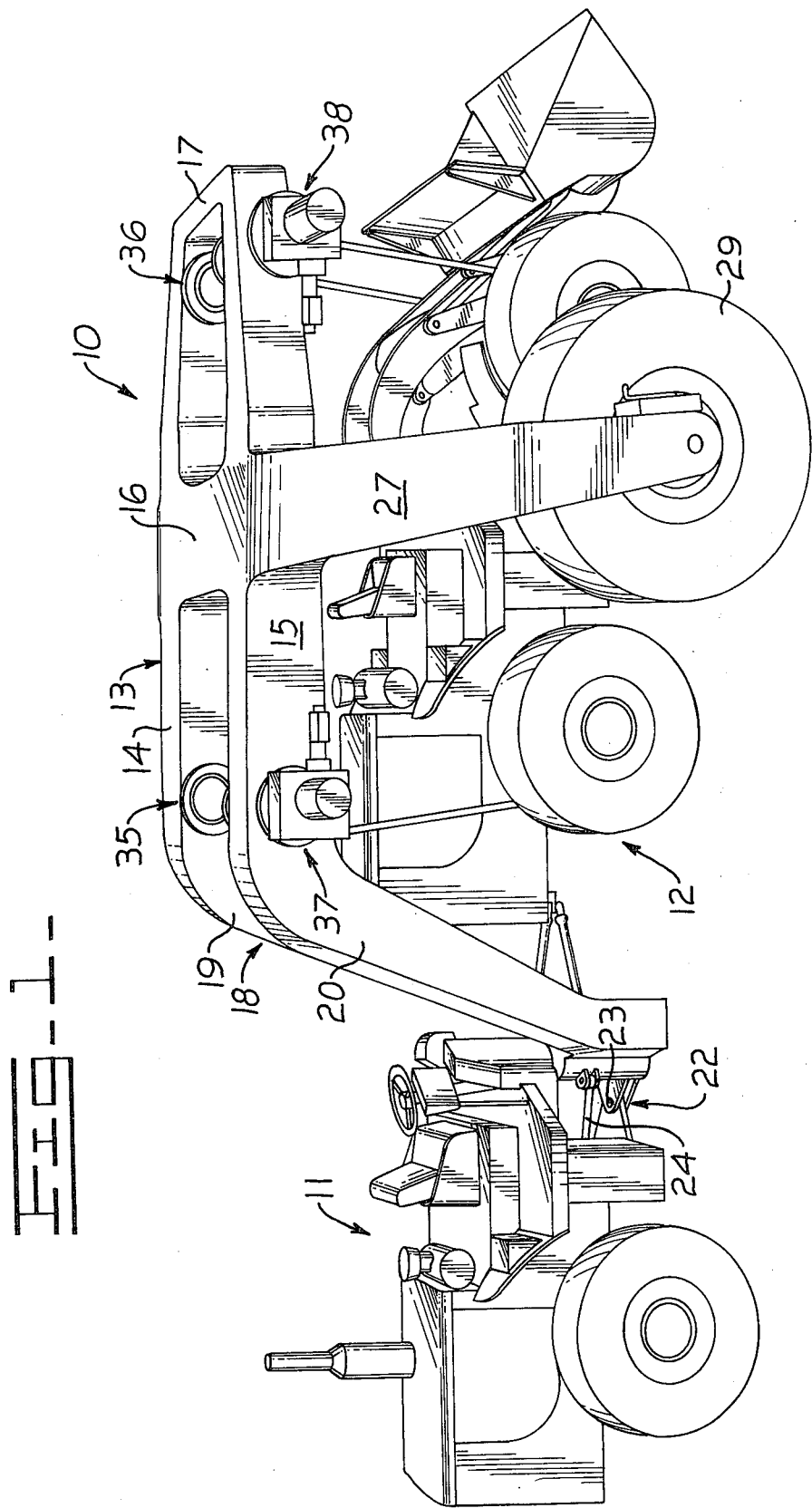
FIG. 1 is a side perspective view of the carrier of this invention, attached to a motorized vehicle, having a wheel loader suspended therein for transport purposes.

Referring to FIGS. 1–3, a vehicle carrier 10 is adapted to be pushed or pulled by a motorized vehicle or tractor 11, operatively connected to a rearward end of the carrier. The carrier may be used to transport a load, such as a wheel loader 12, between assembly lines in a manufacturing facility or may be used to store the wheel loader. The carrier comprises a generally rectangular upper section 13 having a pair of laterally spaced and longitudinally extending members 14 and 15 secured together by an intermediate first cross-member 16 and a forwardly disposed second cross-member 17.

A rear section 18 comprises a pair of laterally spaced members 19 and 20, secured at their upper ends to the rearward ends of members 14 and 15, respectively. The lower ends of members 19 and 20 are secured together by a laterally extending third cross-member 21 (FIG. 4) attached to motorized vehicle 11 by an articulated joint connection 22, including a vertically disposed pivot pin 23. A hydraulic cylinder 24 (only partially shown) is pivotally interconnected between the carrier and vehicle for conventional steering purposes.

The carrier further comprises a pair of laterally spaced side sections 26 and 27 secured at their upper ends between forward and rearward ends of upper section 13. The side sections extend downwardly from the upper section to form an inverted cradle with the upper and rear sections which is open at the forward end thereof. Road wheels 28 and 29 are rotatably mounted on the lower ends of side sections 26 and 27, respectively. The attachment means mounted on the carrier for releasably attaching wheel loader 12 therein will now be described.

As more clearly shown in FIG. 4, a pair of anti-sway links 30 and 31 have their rearward ends pivotally mounted interiorly on member 21 by pins 32 and 33, respectively. The length of each link may be adjusted by suitable inter-engaging thread means (not shown) formed in a conventional manner between the case and rod of each link. The eye ends of the links may be normally held in place by a pin 34, adapted to attach the links to a bracket B secured beneath the rearward end of transported wheel loader 12 (FIG. 2).

The attachment means further comprises four substantially identical winch assemblies 35, 36, 37 and 38 mounted at the corners of upper section 13 of the carrier (FIGS. 1 and 3). Referring to FIG. 5, each winch assembly comprises a stepped-down planetary gear set 39 adapted to rotate a cable drum 40, disposed interiorly of upper section 13. The gear set is driven by an input shaft 41 detachably connected to an output shaft 42 of a second stepped-down planetary gear set 43. Gear set 43 is driven by a conventional hydraulic motor 44 mounted exteriorly of upper section 13 and integrated into the hydraulic control system of vehicle 11 by suitable conduits and connections, not shown.

A housing 45 is secured on member 14 of the top section to carry cable drum 40 on an inboard side thereof and motor 44 and its reduction gear set 43 on an outboard side thereof. The housing is tilted to dispose a rotational axis X of drum 40 at an acute angle $a$ (preferably selected from the range of from 3° to 10°) with respect to a horizontal plane. Such disposition of the cable drum will thus pay out cable 46 which is entrained thereon substantially perpendicular to axis X and downwardly and inwardly towards the center of the carrier to provide a straight line pull on the cable between the drum and wheel tractor 12 (FIG. 1). The free ends of the cables may be attached to the wheel loader in any conventional manner, such as by hooks.

Figure 6:
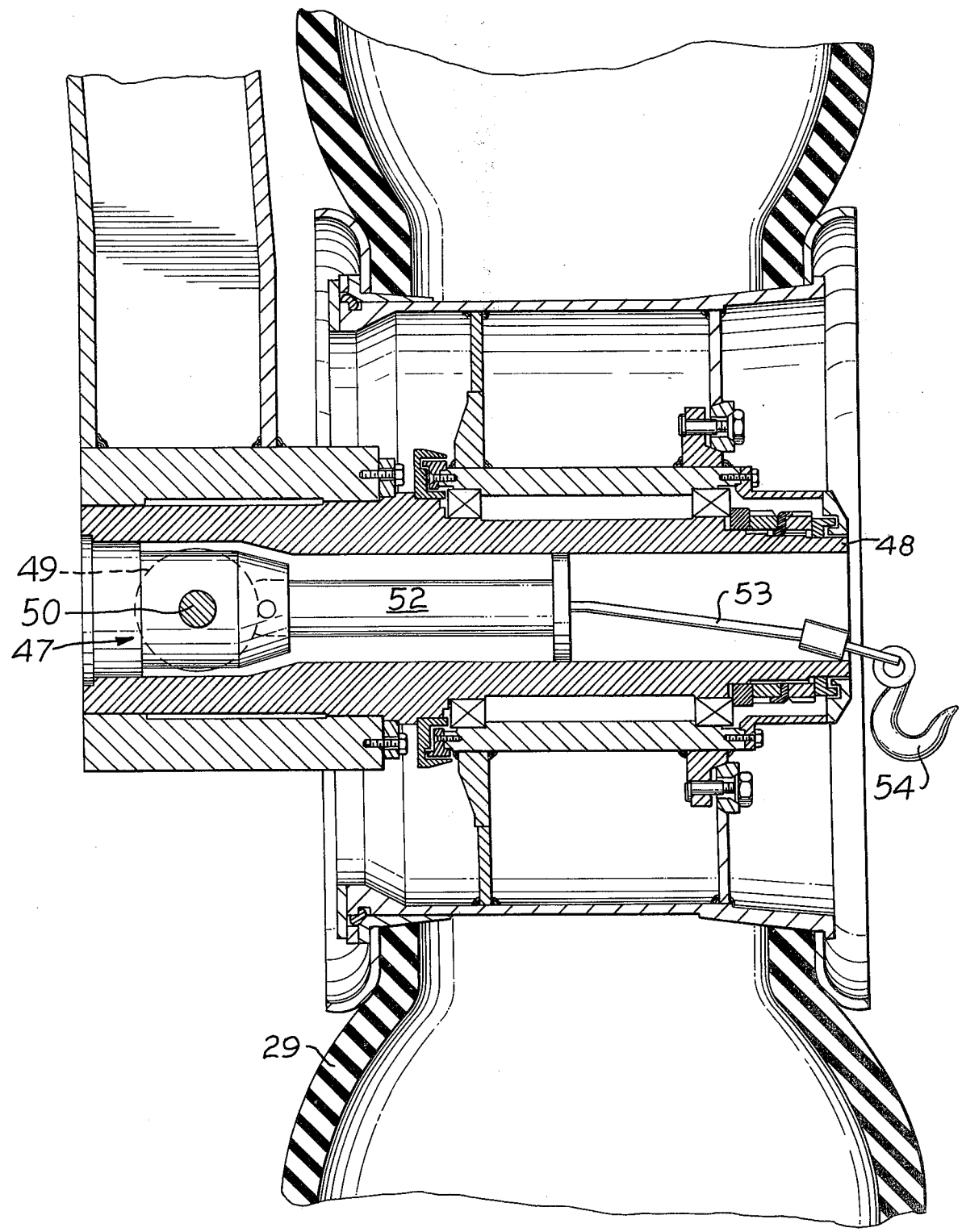
FIG. 6 is a sectional view through a wheel axle of the carrier.

The attachment means may further comprise anti-sway means for preventing lateral movement of the transported vehicle, as illustrated in FIG. 6. Such means comprises a hand-operated winch assembly 47 mounted in a bore formed through an axle 48, having wheel 29 rotatably mounted thereon. The winch assembly comprises a cable drum 49 secured on a shaft 50 adapted to be rotated by a handle 51 (FIG. 4) and a suitably integrated planetary gear set (not shown).

A tubular guide 52 is secured in axle 48 to guide a cable 53 therethrough which is paid-out and paid-in by cable drum 49. A hook member 54 is attached to the free end of the cable for attachment to sides of the transported vehicle 12. The FIG. 6 anti-sway means is duplicated on the opposite side of the carrier at wheel 28, as indicated by numerals depicting corresponding constructions.

We claim:

1. A carrier comprising an upper section having a forward cantilevered end and a rearward end, a rear section secured to the rearward end of said upper section and extending downwardly therefrom to adapt it for attachment to a motorized vehicle, a pair of laterally spaced side sections secured between the forward and rearward ends of said upper section and extending downwardly therefrom to form an inverted cradle with said upper and rear sections open at the forward end thereof, a roadwheel rotatably mounted on a lower end of each of said side sections, and attachment means comprising a plurality of winch assemblies mounted on the upper section of said carrier for releasably attaching a load in the cradle formed thereby and anti-sway means mounted in an axle for each of said road wheels.

2. The carrier of claim 1 further comprising a motorized vehicle attached to the rear section of said carrier.

3. The carrier of claim 2 wherein said motorized vehicle is attached to the rear section of said carrier by an articulated joint connection.

4. The carrier of claim 1 wherein said upper section comprises a pair of laterally spaced and longitudinally extending members secured together by at least one laterally extending cross-member.

5. The carrier of claim 4 wherein a first said cross-member is disposed intermediate the forward and rearward ends of said upper section and extends laterally between said side sections and a second said cross-member is disposed at the forward end of said upper section.

6. The carrier of claim 5 wherein said rear section comprises a pair of laterally spaced members respectively secured at their upper ends to the rearward ends of said longitudinally extending members.

7. The carrier of claim 6 further comprising a third cross-member extending laterally between and secured to lower ends of the members of said rear section.

8. The carrier of claim 1 wherein said upper section is generally rectangular and a winch assembly is mounted at each corner thereof.

9. The carrier of claim 1 wherein each of said winch assemblies comprises a cable drum rotatably mounted interiorly of said upper section and drive means, operatively connected to said cable drum, mounted exteriorly of said upper section.

10. The carrier of claim 9 wherein said drive means comprises a motor operatively connected to said cable drum by at least one stepped-down planetary gear set.

11. The carrier of claim 1 wherein the rotational axis of a cable drum of each of said winch assemblies is tilted to dispose it at an acute angle relative to an imaginary horizontal plane to position a cable, entrained on said cable drum, downwardly and inwardly towards a center of said carrier.

12. The carrier of claim 1 wherein said attachment means further comprises a pair of anti-sway links pivotally mounted interiorly on a lower end of said rear section.

13. The carrier of claim 1 wherein each of said anti-sway means comprises a cable drum and a cable entrained on said drum, said cable extending through said axle to terminate at an inboard side thereof.

14. The carrier of claim 13 wherein each of said anti-sway means further comprises a hook member attached to a free end of said cable.

15. A carrier comprising an upper section having a forward cantilevered end and a rearward end, a rear section secured to the rearward end of said upper section and extending downwardly therefrom to adapt it for attachment to a motorized vehicle, a pair of laterally spaced side sections secured between the forward and rearward ends of said upper section and extending downwardly therefrom to form an inverted cradle with said upper and rear sections open at the forward end thereof, a roadwheel rotatably mounted on a lower end of each of said side sections, and attachment means comprising a plurality of winch assemblies mounted on the upper section of said carrier for releasably attaching a load in the cradle formed thereby and wherein the rotational axis of a cable drum of each of said winch assemblies is tilted to dispose it at an angle relative to an imaginary horizontal plane to position a cable, entrained on said cable drum, downwardly and inwardly towards a center of said carrier.

* * * * *